United States Patent
Tan et al.

(10) Patent No.: US 7,906,933 B2
(45) Date of Patent: Mar. 15, 2011

(54) APPARATUS AND METHOD FOR DRIVING AN INDUCTION MOTOR

(75) Inventors: Daisuke Tan, Hitachinaka (JP);
Hirohisa Satomi, Hitachi (JP);
Shigetoshi Okamatsu, Hitachinaka (JP);
Koichi Miyazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 11/764,820

(22) Filed: Jun. 19, 2007

(65) Prior Publication Data

US 2008/0007196 A1    Jan. 10, 2008

(30) Foreign Application Priority Data

Jun. 22, 2006 (JP) ................................. 2006-172531

(51) Int. Cl.
*H02P 27/04* (2006.01)
(52) U.S. Cl. ...... 318/801; 318/803; 318/727; 318/400.3; 361/56; 361/55; 361/57; 361/100; 361/95; 363/55; 363/34; 363/123; 363/125; 363/131
(58) Field of Classification Search .................. 318/801, 318/803, 727, 148, 400.3; 361/56, 55, 57, 361/100, 95, 101; 363/55, 34, 123, 125, 363/131
See application file for complete search history.

(56) References Cited

U.S. PATENT DOCUMENTS

| | | | |
|---|---|---|---|
| 3,781,616 A * | 12/1973 | Mokrytzki et al. | 318/801 |
| 4,139,885 A * | 2/1979 | Overzet et al. | 363/58 |
| 4,230,979 A * | 10/1980 | Espelage et al. | 318/721 |
| 4,238,821 A * | 12/1980 | Walker | 363/58 |
| 4,331,994 A * | 5/1982 | Wirth | 361/56 |
| 4,344,026 A * | 8/1982 | Yoshioka | 318/806 |
| 5,055,703 A * | 10/1991 | Schornack | 307/64 |
| 5,705,909 A * | 1/1998 | Rajashekara | 318/801 |
| 6,229,722 B1 * | 5/2001 | Ichikawa et al. | 363/71 |
| 6,940,734 B2 * | 9/2005 | Okuma | 363/37 |
| 7,019,989 B2 * | 3/2006 | Kobayashi et al. | 363/37 |
| 7,429,807 B2 * | 9/2008 | Katayama et al. | 307/64 |

FOREIGN PATENT DOCUMENTS

| | | |
|---|---|---|
| JP | A 4-365770 | 12/1992 |
| JP | U-0564340 | 3/1993 |
| JP | 5-083989 | 4/1993 |
| JP | 5-336787 | 12/1993 |
| JP | A 04-336787 | 12/1993 |
| JP | 8-116675 | 5/1996 |
| JP | 09247991 A * | 9/1997 |
| JP | 2000236695 A * | 8/2000 |
| JP | 2002171695 A * | 6/2002 |

* cited by examiner

*Primary Examiner* — Rita Leykin
(74) *Attorney, Agent, or Firm* — Antonelli, Terry, Stout & Kraus, LLP.

(57) ABSTRACT

An induction motor drive includes a plurality of inverters, a changeover switch which changes over outputs of the plurality of inverters to be supplied to one induction motor and a changeover controller which controls the changeover switch on the basis of a failure detection signal of one inverter to change over from the one inverter to another inverter to start the other inverter so that the induction motor is driven. The changeover controller includes a frequency/phase detector which always detects a frequency and a phase of a terminal voltage of the induction motor and a starting frequency/phase setting device which controls a frequency and a phase at starting of the other inverter in accordance with detected values of the frequency/phase detector when the failure signal is inputted.

4 Claims, 3 Drawing Sheets

APPARATUS AND METHOD FOR DRIVING AN INDUCTION MOTOR

BACKGROUND OF THE INVENTION

The present invention relates to an induction motor drive which carries out adjustable speed operation of an induction motor by an inverter and more particularly to technique effective when one inverter fails and the inverter is changed over from the failed inverter to another inverter to drive the induction motor.

The induction motor drive for carrying out adjustable speed operation of the induction motor by the inverter is widely used to carry out adjustable speed operation of various machines (hereinafter referred to as load) such as fan and pump. Further, in case of an important load which is not allowed to be stopped even if failure occurs, inverters are duplexed and when one inverter fails, the inverter is changed over from the failed inverter to the other inverter to continue the adjustable speed operation without stopping operation of the load.

For example, in an induction motor drive described in JP-A-5-336787 (patent document 1), a failure signal of a failed inverter is sent to the other inverter and after the other inverter confirms changeover of a switch connected between the induction motor and the other inverter, the inverter starts the operation of the induction motor. Especially, the other normal inverter sets a starting frequency so as to match the speed of the induction motor rotating inertially upon changeover, so that the changeover is made smoothly while the operation of the inverter is synchronized with the speed of the induction motor. Consequently, even if one inverter fails, it can be changed over to the other inverter, so that the adjustable speed operation of the induction motor can be continued without stopping operation of the induction motor.

Further, JP-A-8-116675 (patent document 2) discloses that only inverter main circuits of an inverter are duplexed and an inverter controller is provided in common to both the inverter main circuits so that the same drive signals are always supplied to both the inverter main circuits and output voltages, phases and frequencies of both the inverter main circuits are synchronized with each other so that the inverter main circuits are changed over from one to the other. Consequently, variation in output (torque shock and the like) of a load upon changeover can be eliminated.

On the other hand, JP-A-5-83989 (patent document 3) discloses a changeover operation apparatus including an adjustable speed inverter which drives induction motors upon sudden adjustable speed operation at the time that induction motors are separated from a spinning line in which induction motors are group-operated and a normal operation inverter which is operated by changing over from the adjustable speed inverter to the normal operation inverter when the induction motors are normally operated in the spinning line. Especially, the inverter to be used after changeover is previously started and a frequency and a phase of an output voltage of the inverter used before changeover are detected, so that the inverters are changed over after the frequency and the phase of the output voltage of the inverter to be used after changeover are synchronized with those of the inverter used before changeover to thereby suppress variation in speed of the induction motor and shorten the changeover time.

SUMMARY OF THE INVENTION

However, the apparatus disclosed in the patent document 1 has a problem that phases of the output voltage of the inverter and the terminal voltage of the induction motor are not matched to each other and accordingly the output of the induction motor is varied depending on a phase difference therebetween, so that the changeover time until the induction motor is returned to the state before failure is lengthened. Further, the apparatus has a problem that since switches on the power side and the load side are changed over after the failure signal of one inverter is received, to initially charge the inverter to be used after changeover and at the same time after the speed of the induction motor is detected to calculate a starting frequency on the basis of the detected value, the inverter to be used after changeover is started, the changeover time is lengthened and the output and the speed of the induction motor are considerably reduced meanwhile.

In addition, the apparatus disclosed in the patent document 2 has a problem that since the inverter controller is provided in common to both the inverter main circuits so that the same drive signals are always supplied to both the inverter main circuits, it is impossible to deal with the case where the inverter controller fails.

Moreover, the invention described in the patent document 3 presupposes that the inverter used before changeover is normal upon changeover and accordingly the invention cannot be applied to the case where one inverter fails and the failed inverter is changed over to the other normal inverter.

It is an object of the present invention to suppress variation in output of an induction motor when one inverter is changed over to the other inverter due to failure of the one inverter to drive the induction motor.

In order to solve the above problems, according to the present invention, an induction motor drive includes a plurality of inverters each having an inverter main circuit and an inverter controller to control the inverter main circuit, a changeover switch to change over outputs of the plurality of inverters to be supplied to one induction motor and a changeover controller to control the changeover switch on the basis of a failure detection signal of one inverter to change over from the one inverter to another inverter to start the other inverter so that the induction motor is driven. The changeover controller includes a frequency/phase detector to always detect a frequency and a phase of a terminal voltage of the induction motor and controls a frequency and a phase at starting of the other inverter in accordance with detected values of the frequency and the phase of the terminal voltage detected by the frequency/phase detector when the failure detection signal is inputted.

More particularly, the frequency of the terminal voltage of the induction motor represents the speed of rotation at the time that supply of driving power to an induction motor is stopped due to failure of one inverter and the induction motor rotates inertially. Accordingly, by always detecting the terminal voltage of the induction motor, the frequency and the phase of the terminal voltage of the induction motor can be detected even during the period from the time that one inverter fails until the one inverter is changed over to another inverter. A frequency and a phase at starting of changeover of the inverter to be used after changeover can be set to be equal to the detected values to thereby synchronize the frequency and the phase of the output voltage of the inverter with the terminal voltage of the induction motor and accordingly variation in output such as variation in speed of the induction motor upon changeover can be suppressed. Further, since the frequency and the phase of the terminal voltage of the induction motor are always detected, the frequency and the phase at starting of changeover can be set simultaneously with inputting of the failure detection signal to thereby shorten the changeover time. Consequently, the inverter can be changed over to be started before the speed of the induction motor is reduced excessively, so that output variation such as torque variation of the induction motor can be minimized.

In addition to the above, it is desirable that the inverter includes an initial charging circuit having a switch which connects the inverter to the AC power supply when the circuit breaker for connecting the inverter to the AC power supply is opened, that is, when the inverter is on standby. In other words, generally, the inverter is started after the time required to charge a smoothing condenser of a DC circuit of the inverter. However, the provision of the initial charging circuit of the present invention does not require the time necessary to charge conductors of an electric circuit of the inverter to be used after changeover and accordingly the start timing of the inverter to be used after changeover can be advanced by that time. Consequently, output variation such as torque variation of the induction motor can be more minimized.

According to the present invention, when one inverter fails, the one inverter is changed over to another inverter to drive the induction motor, so that output variation of the induction motor upon changeover can be suppressed.

Other objects, features and advantages of the invention will become apparent from the following description of the embodiments of the invention taken in conjunction with the accompanying drawings.

DESCRIPTION OF THE EMBODIMENTS

Figure 1:
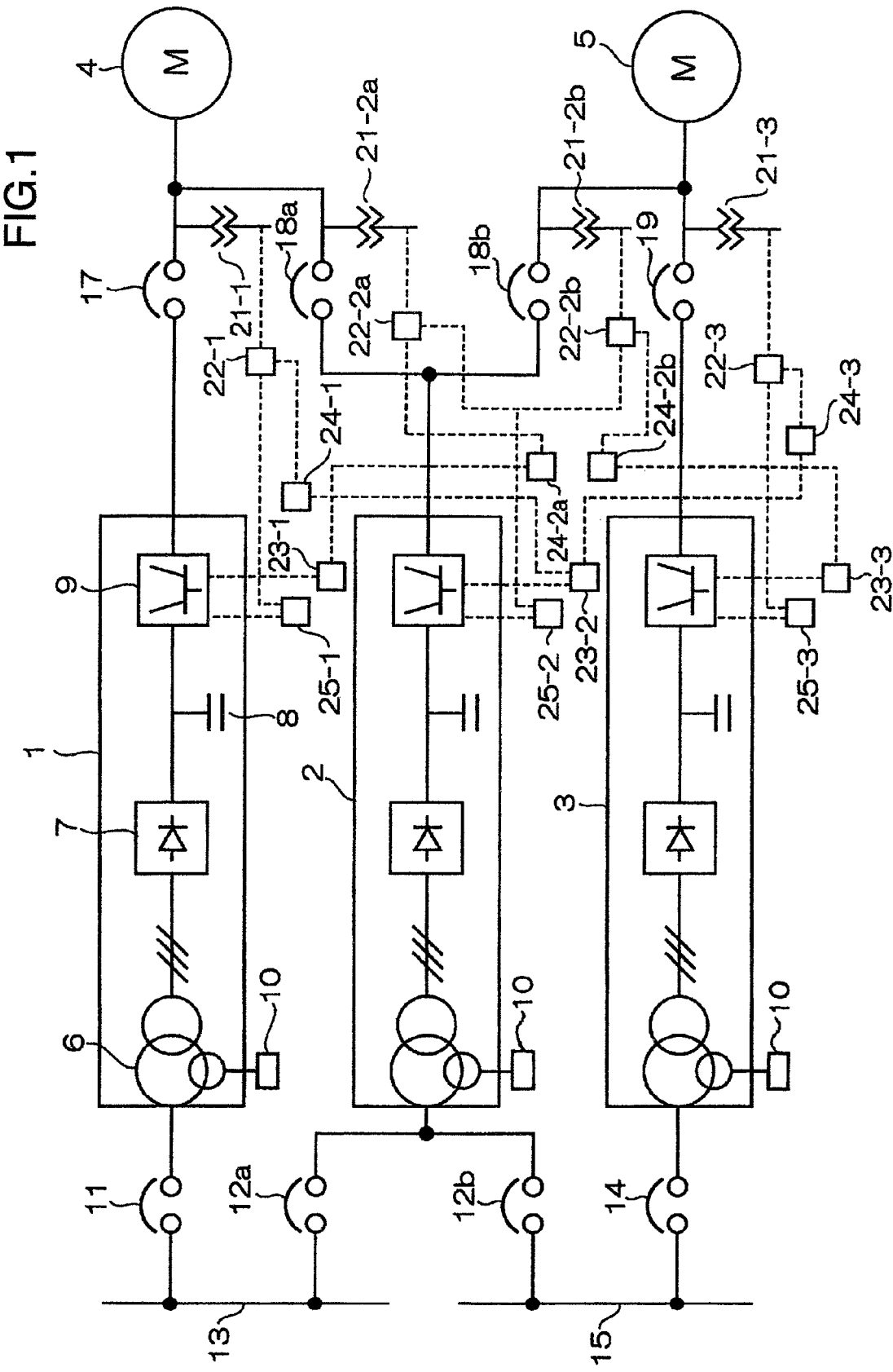
FIG. 1 is a block diagram schematically illustrating an induction motor drive according to an embodiment of the present invention.

Embodiments of the present invention are now described with reference to the accompanying drawings. FIG. 1 is a block diagram illustrating an induction motor drive according to an embodiment of the present invention. As illustrated in FIG. 1, the induction motor drive of the embodiment includes three inverters 1, 2 and 3. Normally, the inverters 1 and 3 operate to drive induction motors 4 and 5, respectively, and when one of the inverters 1 and 3 fails, it can be changed over to the auxiliary inverter 2 which is provided in common to both the inverters 1 and 3. Further, when the inverter 2 fails in case where one of the induction motors 4, 5 is driven by the inverter 2, if the inverter 1 or 3 is recovered, the inverter 2 can be changed over to the inverter 1 or 3 corresponding to the induction motor 4 or 5 driven by the inverter 2.

Since the inverters 1, 2 and 3 have the same configuration, the configuration of the inverter 1 is described in detail and description of other inverters is omitted. The inverter 1 includes a transformer 6 for transforming inputted AC voltage, a rectifier 7 for converting AC voltage adjusted by the transformer 6 into DC voltage, a smoothing condenser 8 for smoothing the rectified DC voltage and an inverter main circuit 9 for inverting the smoothed DC voltage into AC voltage having set voltage, frequency and phase. Further, although not shown, the inverter main circuit 9 of the inverters 1, 2 and 3 includes an inverter controller for controlling the inverter main circuit 9 on the basis of an inputted command. In addition, the transformer 6 includes a winding connected to an initial charging circuit 10.

Input terminals of the inverters 1 and 2 are connected to a common AC power bus 13 through circuit breakers 11 and 12a, respectively, and input terminals of the inverters 2 and 3 are connected to another common AC power bus 15 through circuit breakers 12b and 14, respectively. Further, output terminals of the inverters 1 and 2 are connected in common to the induction motor 4 through circuit breakers 17 and 18a, respectively, and output terminals of the inverters 2 and 3 are connected in common to the induction motor 5 through circuit breakers 18b and 19, respectively.

The configuration of a changeover controller in the embodiment of the present invention is now described. Voltage transformers 21 (21-1, 21-2a, 2b and 21-3) are connected to electric circuits on the load side of the circuit breakers 17, 18a, 18b and 19 of the inverters 1, 2 and 3. Outputs of the voltage transformers 21 are supplied to frequency/phase detectors 22 (22-1, 22-2a, 2b and 22-3). The frequency/phase detector 22 is constituted by well-known phase locked loop (PLL) circuit and always detects a frequency and a phase of voltage corresponding to terminal voltage of the induction motor 4 or 5 detected by the voltage transformer 21. The phase is detected by integrating the frequency.

Further, failure detectors 23 (23-1, 23-2 and 23-3) are provided in a corresponding manner to the inverters 1, 2 and 3. When the failure detector 23 detects failure of the inverter 1, 2 or 3, the failure detector 23 supplies a failure signal to a failure signal receiver 24 of the inverter set as a changeover device. In other words, the failure detector 23-1 supplies the failure signal to the failure signal receiver 24-2a, the failure detector 23-2 supplies the failure signal to the failure signal receivers 24-1 and 24-3 and the failure detector 23-3 supplies the failure signal to the failure receiver 24-2b. Further, when the failure detector 23 detects failure in the inverter corresponding thereto, the failure detector 23 controls to open the circuit breakers on the AC power side and the load side of the inverter. Moreover, when the failure signal receiver 24 receives the failure signal, the failure signal receiver 24 controls to turn on or close the circuit breakers on the AC power side and the load side of the inverter corresponding thereto.

When the failure signal receiver 24 receives the failure signal, the failure signal receiver 24 supplies a trigger signal to the frequency/phase detector 22 of the inverter set as the changeover device. That is, the failure signal receiver 24-1 supplies the trigger signal to the frequency/phase detector 22-1, the failure signal receiver 24-2a to the frequency/phase detector 22-2a, the failure signal receiver 24-2b to the frequency/phase detector 22-2b, and the failure signal receiver 24-3 to the frequency/phase detector 22-3.

The frequency/phase detector 22 supplies detected values of a frequency and a phase at the time that the trigger signal is supplied thereto, to a starting frequency/phase setting device 25 of the inverter corresponding thereto. That is, the frequency/phase detectors 22-1 supplies the detected values of the frequency and the phase to the starting frequency/phase setting device 25-1, the frequency/phase detector 22-2a and 2b to the starting frequency/phase setting device 25-2, and the frequency/phase detector 22-3 to the starting frequency/phase setting device 25-3.

The starting frequency/phase setting device 25 (25-1, 25-2 and 25-3) supplies a command value of a frequency and a phase at starting to the inverter controller of the inverter 1-3 corresponding thereto. The inverter controller controls the inverter main circuit to supply an output voltage having the starting frequency and phase corresponding to the command value to the induction motor 4 or 5 through the circuit breaker 17 or 18*a* or the circuit breaker 18*b* or 19.

Figure 2:
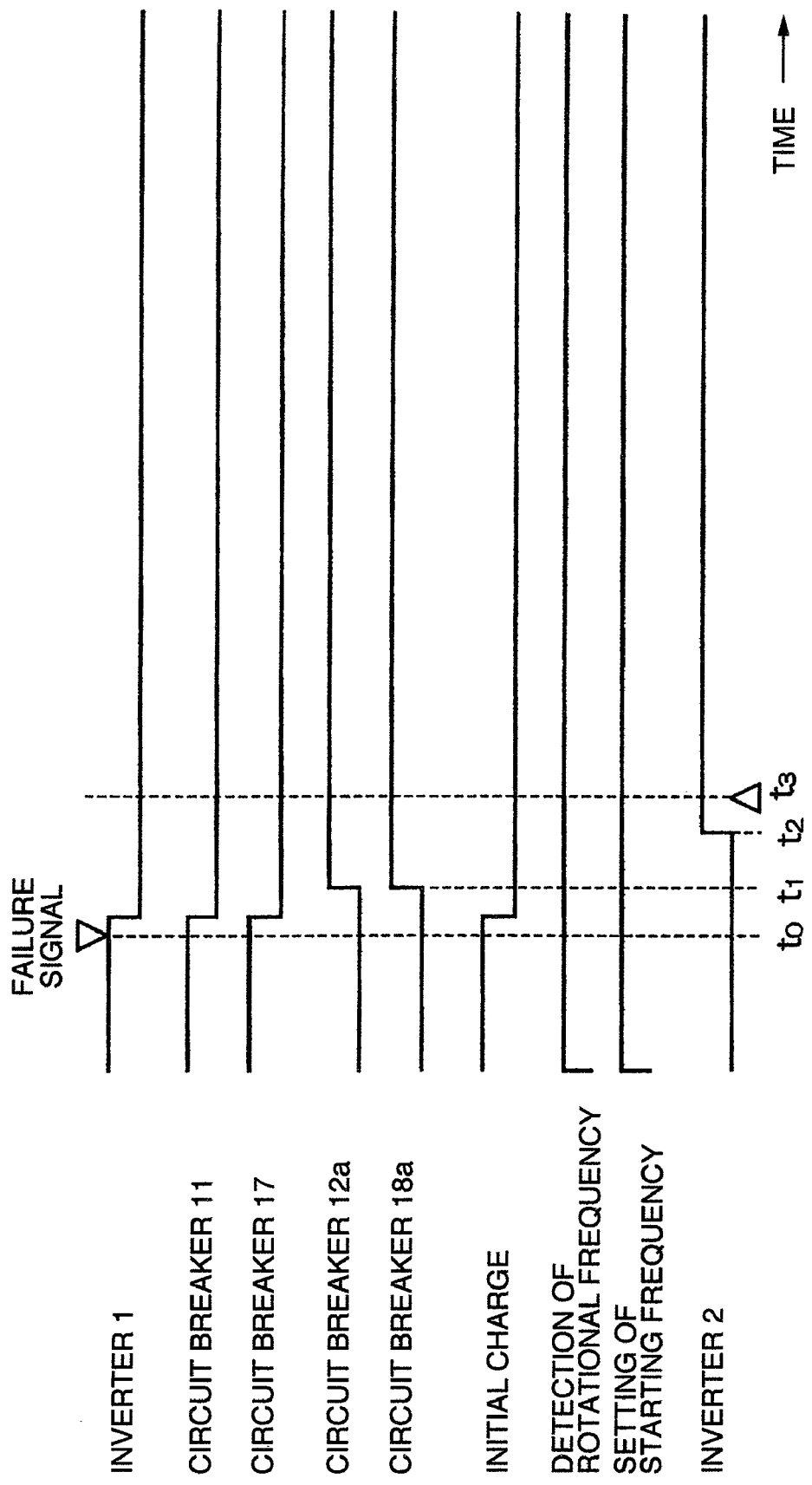
FIG. 2 is a timing chart showing changeover control operation of the induction motor drive according to the embodiment of the present invention.

Operation of the embodiment configured as above is now described with reference to the timing chart showing the operation of the embodiment shown in FIG. 2. For simplification of description, the case where failure occurs in the rectifier 7, the inverter main circuit 9 or the inverter controller constituting the inverter 1 is described by way of example. The frequency/phase detector 22-2*a* always takes in the detected voltage corresponding to the terminal voltage of the induction motor 4 from the voltage transformer 21-2*a* and always detects the frequency and the phase of the detected voltage.

When failure in the inverter 1 is detected by the failure detector 23-1 at time t0, the circuit breakers 11 and 17 are turned off at the same time. In addition, a switch of the initial charging circuit 10 which initially charges the inverter 2 during a waiting period is opened. Thereafter, the circuit breakers 12*a* and 18*a* of the inverter 2 to which the failed inverter 1 is changed over are turned on simultaneously at time t1. Further, the frequency/phase detector 22-2*a* is triggered by the failure signal supplied from the failure detector 23-1 and supplies the detected values of the frequency and the phase at that time to the starting frequency/phase setting device 25-2. The starting frequency/phase setting device 25-2 supplies the command value of the frequency and the phase at starting to the inverter controller of the inverter 2 in accordance with the detected value of the frequency and the phase supplied thereto. Consequently, the inverter 2 can be started immediately since the inverter 2 has been already charged initially.

Then, at time t2, the inverter controller starts the inverter main circuit 9 in accordance with the command value of the frequency and the phase at starting supplied from the starting frequency/phase setting device 25-1. Consequently, the output voltage having the frequency and the phase corresponding to the terminal voltage of the induction motor 4 is supplied to the induction motor 4 through the circuit breaker 18*a*, so that the induction motor 4 rotating inertially is accelerated smoothly and is rapidly recovered to generate the output before failure.

Figure 3:
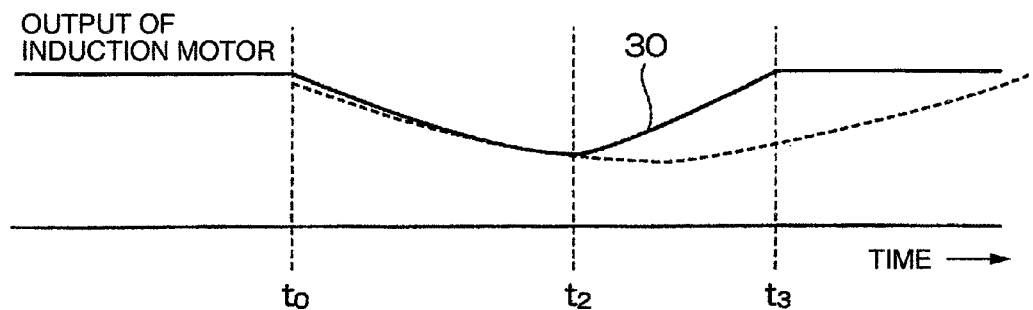
FIG. 3 is a diagram showing change of an output of the induction motor upon changeover to explain the effects of the present invention.

Change of the output of the induction motor 4 at this time is shown by curve 30 of FIG. 3. As shown in FIG. 3, when the circuit breaker 17 is opened or turned off at time t0 due to the failure of the inverter 1, the induction motor 4 begins to reduce its output by only inertial rotating force. Thereafter, at time t2, when the inverter 2 is started at the frequency and the phase corresponding to the terminal voltage of the induction motor 4 at this time, the induction motor 4 is accelerated smoothly and is rapidly recovered to generate the output before failure at time t3.

As described above, according to the embodiment, since the frequency/phase detector 22-2*a* always detects the frequency and the phase of the detected voltage corresponding to the terminal voltage of the induction motor 4, the starting frequency and phase of the inverter 2 to be used after changeover can be immediately set upon changeover caused by failure. In other words, the time for setting the starting frequency and phase anew after the inverter is changed over is not required and accordingly the changeover time can be shortened by that time.

Generally, the inverter requires initial charging at its starting, although in the embodiment since the initial charting circuit 10 is provided to initially charge the inverter during a waiting period before changeover, the changeover time of the inverter can be shortened by the initial charging time as compared with the case where the initial charging is made after changeover.

Heretofore, generally, the circuit breakers on the AC power side and the load side of the inverter are opened and closed in a predetermined order so that when the circuit breaker (e.g. 11) on the AC power side and the circuit breaker (e.g. 17) on the load side of the inverter are turned off or opened, the circuit breaker on the load side is opened after the circuit breaker on the power side is opened and when the circuit breakers are turned on or closed, the circuit breakers are turned on in the reverse order. In this respect, according to the embodiment, the circuit breakers on the AC power side and the load side are opened and closed simultaneously as shown in FIG. 2 and accordingly the delay of the changeover time can be shortened even from this standpoint.

As described above, according to the embodiment, when one inverter fails, operation can be changed over from the one inverter to the other normal inverter in a shortest time, so that reduction of the output of the induction motor upon changeover of the inverter can be minimized. Accordingly, influence on operation of the whole system such as a plant due to the reduced output of the induction motor can be avoided, so that the reliability of the plant can be improved.

Consequently, energy-saving operation using the inverter can be applied to the plant in which application of the inverter thereto has a problem when influence upon failure of the inverter is considered. Further, since it is not necessary to directly mount a speed detector to a shaft of the induction motor, application of the present invention is easy.

In the embodiment, two inverters and one standby inverter for two induction motors constitute a redundant system or a duplexed system, although the present invention is not limited thereto and N inverters and one standby inverter for N induction motors may constitute an N-to-1 redundant system. Consequently, the cost for constructing a system into a redundant form can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An induction motor driving apparatus, the apparatus comprising:
   a plurality of inverters each including an inverter main circuit and an inverter controller to control the inverter main circuit;
   a changeover switch to change over outputs of the plurality of inverters to be supplied to one induction motor;
   a changeover controller to control the changeover switch on the basis of a failure detection signal of one inverter of said plurality of inverters to change over from the one inverter to another inverter of said plurality of inverters to start said another inverter so that the induction motor is driven; and
   a plurality of DC circuits, each of the plurality of DC circuits is connected to each of the plurality of inverters and includes a rectifier and a smoothing capacitor connected to an input of the inverter main circuit; wherein
   the changeover controller includes a frequency/phase detector to detect a frequency and a phase of a terminal voltage of the induction motor and controls a frequency and a phase at starting of said another inverter in accordance with detected values of the frequency and the phase of the terminal voltage detected by the frequency/phase detector when the failure detection signal is inputted; and each of the plurality of inverters includes an initial charging circuit to charge the smoothing capacitor connected to the inverter main circuit of said another inverter when a circuit breaker, connected between an AC power supply and said another inverter, is opened to provide an initial charge of the smoothing capacitor connected to the inverter main circuit of said another inverter before changing over from said one inverter to said another inverter;

wherein said initial charging circuit provided separately from said another inverter for charging the smoothing capacitor connected to the inverter main circuit of said another inverter during a waiting period thereof before changing over from said one inverter to said another inverter, so that the charged smoothing capacitor causes said another inverter to start immediately after the changing over from said one inverter to said another inverter.

2. An induction motor driving apparatus according to claim 1, wherein the frequency/phase detector includes a phase locked loop (PLL) circuit which is supplied with a detected value of the terminal voltage.

3. An induction motor driving method comprising:

changing over outputs of a plurality of inverters by a changeover switch to be supplied to one induction motor;

controlling the changeover switch on the basis of a failure detection signal of one inverter of said plurality of inverters to change over from the one inverter to another inverter of said plurality of inverters by a changeover controller to start said another inverter so that the induction motor is driven;

connecting each of a plurality of DC circuits to each of the plurality of inverters, where each DC circuit includes a rectifier and a smoothing capacitor connected to said one inverter;

making the changeover controller control a frequency/phase detector to always detect a frequency and a phase of a terminal voltage of the induction motor;

controlling a frequency and a phase at starting of said another inverter in accordance with detected values of the frequency and the phase of the terminal voltage detected by the frequency/phase detector when the failure detection signal is inputted;

charging said another inverter by an initial charging circuit, when a circuit breaker connected between an AC power supply and said another inverter is opened to provide an initial charge of the smoothing capacitor connected to said another inverter before changing over from said one inverter to said another inverter; and providing said initial charging circuit separately from said another inverter for charging the smoothing capacitor connected to said another inverter during a waiting period thereof before changing over from said one inverter to said another inverter, so that the charged smoothing capacitor causes said another inverter to start immediately after the changing over from said one inverter to said another inverted.

4. An induction motor driving apparatus, the apparatus comprising:

a plurality of inverters each including an inverter main circuit and an inverter controller to control the inverter main circuit;

a changeover switch to change over outputs of the plurality of inverters to be supplied to one induction motor;

a changeover controller to control the changeover switch on the basis of a failure detection signal of one inverter of said plurality of inverters to change over from the one inverter to another inverter of said plurality of inverters to start said another inverter so that the induction motor is driven; and a plurality of DC circuits, each of the plurality of DC circuits is connected to each of the plurality of inverters and includes a rectifier and a smoothing capacitor connected to an input of the inverter main circuit; wherein the changeover controller includes a frequency/phase detector to detect a frequency and a phase of a terminal voltage of the induction motor and controls a frequency and a phase at starting of said another inverter in accordance with detected values of the frequency and the phase of the terminal voltage detected by the frequency/phase detector when the failure detection signal is inputted;

means for shortening a change over time from said one inverter to said another inverter, said means comprising each of the plurality of inverters including an initial charging circuit to charge said another inverter when a circuit breaker, connected between an AC power supply and said another inverter, is opened to provide an initial charge of the smoothing capacitor connected to the inverter main circuit of said another inverter before changing over from said one inverter to said another inverter; and wherein said initial charging circuit provided separately from said another inverter for charging the smoothing capacitor connected to the inverter main circuit of said another inverter during a waiting period thereof before changing over from said one inverter to said another inverter, so that the charged smoothing capacitor causes said another inverter to start immediately after the changing over from said one inverter to said another inverter.

* * * * *